United States Patent
Albouy et al.

(10) Patent No.: US 9,650,158 B2
(45) Date of Patent: May 16, 2017

(54) CENTRALIZED MAINTENANCE DEVICE FOR AIRCRAFT

(75) Inventors: Christian Albouy, Saint Alban (FR); Xavier Chazottes, Valence (FR)

(73) Assignee: Thales, Courbevoie (FR)

( * ) Notice: Subject to any disclaimer, the term of this patent is extended or adjusted under 35 U.S.C. 154(b) by 111 days.

(21) Appl. No.: 13/997,163

(22) PCT Filed: Dec. 13, 2011

(86) PCT No.: PCT/EP2011/072650
§ 371 (c)(1),
(2), (4) Date: Jun. 21, 2013

(87) PCT Pub. No.: WO2012/084613
PCT Pub. Date: Jun. 28, 2012

(65) Prior Publication Data
US 2013/0274994 A1    Oct. 17, 2013

(30) Foreign Application Priority Data
Dec. 23, 2010    (FR) ...................................... 10 05086

(51) Int. Cl.
*B64F 5/00* (2006.01)
*G06F 11/07* (2006.01)
*G05B 23/02* (2006.01)

(52) U.S. Cl.
CPC ............ *B64F 5/00* (2013.01); *G05B 23/0272* (2013.01); *G06F 11/0739* (2013.01); *G06F 11/0784* (2013.01)

(58) Field of Classification Search
CPC ... B64F 5/00; G05B 23/0272; G04F 11/0739; G04F 11/0784

USPC ......................................................... 701/33.4
See application file for complete search history.

(56) References Cited

U.S. PATENT DOCUMENTS

| 8,321,078 | B2 * | 11/2012 | Vial ................................ 701/14 |
| 8,560,163 | B2 * | 10/2013 | Bernard et al. .............. 701/30.4 |
| 2005/0096873 | A1 * | 5/2005 | Klein ..................... G01H 1/006 702/184 |
| 2010/0030807 | A1 * | 2/2010 | Topping ................. G06Q 10/06 705/1.1 |

FOREIGN PATENT DOCUMENTS

| FR | 2 891 379 A1 | 3/2007 |
| FR | 2 927 435 A1 | 8/2009 |
| FR | 2 933 789 A1 | 1/2010 |
| FR | 2 935 179 A1 | 2/2010 |

* cited by examiner

*Primary Examiner* — Khoi Tran
*Assistant Examiner* — Robert Nguyen
(74) *Attorney, Agent, or Firm* — Baker Hostetler LLP

(57) ABSTRACT

A centralized maintenance device installed on-board an aircraft notably carries out the following functions: correlation of data relating to failures, warnings, configurations, operational contexts, flags and the logbook, received by the on-board maintenance system; storage of the data received by the on-board maintenance system in a first database; management of a historical record of the data received and of their correlation; transmission to a man-machine interface of the data received, of their correlation and of a date associated with each item of data; display of the received data, their correlation and the date associated with each item of data, by a man-machine interface of the on-board maintenance system.

19 Claims, 4 Drawing Sheets

CENTRALIZED MAINTENANCE DEVICE FOR AIRCRAFT

CROSS-REFERENCE TO RELATED APPLICATIONS

This application is a National Stage of International patent application PCT/EP2011/072650, filed on Dec. 13, 2011, which claims priority to foreign French patent application No. FR 1005086, filed on Dec. 23, 2010, the disclosures of which are incorporated by reference in their entirety.

FIELD OF THE INVENTION

The present invention relates to a centralized maintenance device. It notably applies to the field of maintenance of items of equipment installed on-board an aircraft.

BACKGROUND

Aircraft comprise many on-board items of electrical, mechanical and data-processing equipment. The functioning of these on-board items of equipment, whose processing is necessary for the correct progress of the flight, is monitored notably by the crew of the aircraft during the flight. Any failure of one of the items of equipment can be reported either by the crew of the aircraft, or by the equipment itself, or by an on-board maintenance equipment to which the equipment can be connected. Once back on the ground, all of the data relating to possible failures are collected and then analysed by a ground maintenance team. One of the challenges of aircraft maintenance is to be able to identify critical failures of on-board items of equipment, as well as their sources, as quickly as possible in order to apply a quick correction and in order to prevent as far as possible an immobilization of an aircraft on the ground, which is very costly for airline companies.

In aircraft, a centralized maintenance system can collect failure indicators coming from the items of equipment of the aircraft as well as warnings intended for the crew of the aircraft. The centralized maintenance system also has some operational context data such as general parameters relating to the aircraft, for example: a date, a timestamp, a flight phase, a maintenance phase, an aircraft type, a registration of the aircraft, a flight number, a departure airport, an arrival airport. The centralized maintenance system carries out a temporal correlation between the failures and the warnings transmitted to the crew as well as a correlation between the failures of the different items of equipment of the aircraft.

For example, one failure is often spotted by aircraft pilots: a failure of the aircraft's radio altimeter. A radio altimeter is a system giving the altitude of the aircraft with respect to the ground. A range of validity of a radio altimeter measurement is typically between zero and two thousand five hundred feet. The radio altimeter does not give an indication of altitude above two thousand five hundred feet. Some pilots enter the following incident in a logbook of the aircraft: "radio altimeter failure, UTC". UTC is an acronym for "Coordinated Universal Time". Once the aircraft is on the ground, a maintenance officer is responsible for putting the aircraft back into a good operational state with respect to the incidents recorded in the logbook. In the case of the incident taken as an example regarding the radio altimeter, no crew warning was raised by an on-board FWS connected to the items of equipment. An FWS is a "Flight Warning System". Moreover, no failure of an LRU was detected by the centralized maintenance system. LRU is an acronym for "Line Replaceable Unit", which denotes an equipment installed on-board an aircraft. The maintenance operator therefore has no additional information for carrying out a diagnosis of the incident mentioned in the logbook. In such a case, the maintenance operator consults a maintenance manual of the aircraft in order to initiate a test on the radio altimeter. The test makes it possible to conclude that the radio altimeter is in a correct operating state, which is the case. It is therefore a matter of a false failure, noted by the pilot without there having been a failure.

Such false failures cause the maintenance crew to waste valuable time on the ground. They can possibly mask serious failures, which are critical for the aircraft.

SUMMARY OF THE INVENTION

A purpose of the invention is notably to overcome the aforesaid disadvantages. For this purpose, the invention relates to a centralized maintenance device, installed on-board an aircraft. The centralized maintenance device takes account of data relating to:
  failures originating from systems of the aircraft;
  warnings coming from a warning system of the aircraft;
  configurations of the systems of the aircraft;
  operational contexts of functioning of the systems of the aircraft;
  event flags, set by a crew of the aircraft;
  a logbook, filled in by the crew of the aircraft;
The said on-board maintenance system also carries out the following functions:
  correlation of data relating to failures, warnings, configurations, operational contexts, flags and the logbook, received in the form of computer data by the on-board maintenance system;
  storage of the data received by the on-board maintenance system in a first database;
  management of a historical record of the data received and of their correlation;
  transmission to a man-machine interface of the data received, of their correlation and of a date associated with each item of data received;
  display of the received data, their correlation and the date associated with each item of data, by the man-machine interface of the on-board maintenance system.

In a particularly advantageous embodiment, the correlation of the data can be carried out according to rules and criteria defined in a second database, forming part of the on-board maintenance device.

The configuration data taken into account by the on-board maintenance device can notably comprise: a list of the systems of the aircraft and a historical record of updates of the systems of the aircraft.

The operational context data can notably comprise physical parameters of the aircraft varying over the course of time: geographical coordinates, altitudes, speeds, mass, aerodynamic configuration, quantity of fuel on-board, operational state of the on-board items of equipment, meteorological conditions.

The invention notably has the principal advantage of presenting a synthetic version of the maintenance data.

BRIEF DESCRIPTION OF THE DRAWINGS

Other features and advantages of the invention will become apparent with the help of the following description, given as a non-limitative illustration and with reference to the appended drawings in which.

DETAILED DESCRIPTION

Figure 1:
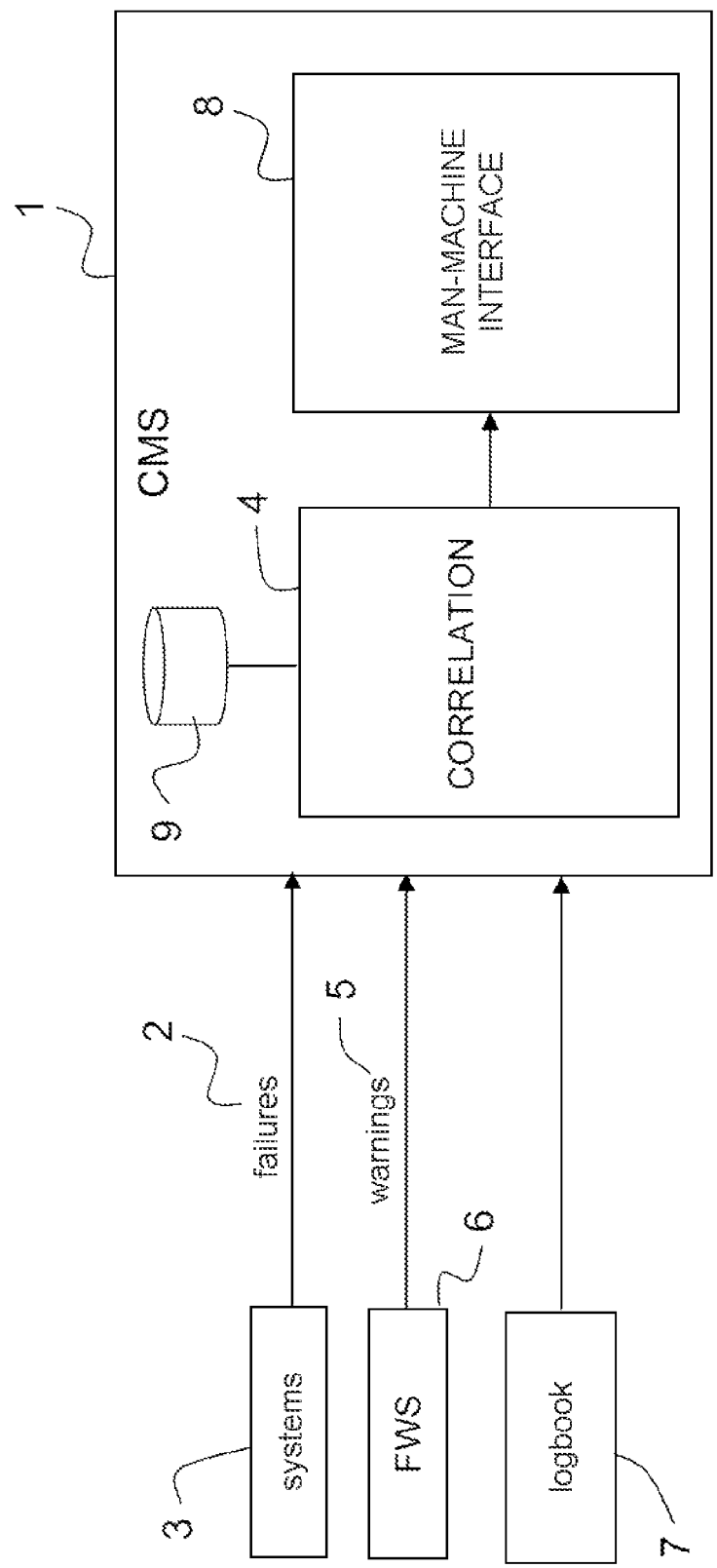
FIG. 1 shows a centralized maintenance device according to the prior art.

FIG. 1 shows a first centralized maintenance device 1 according to the prior art. The CMS 1, an acronym for "Centralized Maintenance System", receives the following data as inputs:
  failure indicators 2, coming from systems or items of equipment 3 of the aircraft;
  warnings 5 coming from an FWS 6 of the aircraft, FWS being an acronym for "Flight Warning System",
  a logbook 7 kept by the crew of the aircraft.

The first CMS 1 carries out a temporal correlation 4 of the received data 2, 5, 7. The correlated data are then transmitted to a first man-machine interface 8 of the first CMS 1. The first CMS 1 notably comprises a database 9 containing configuration data of the aircraft which can be used by the correlation 4 in order to provide additional information associated with the data presented on the man-machine interface 8. Such a centralized maintenance system only allows a curative treatment of the failures detected during the flight.

Figure 2:
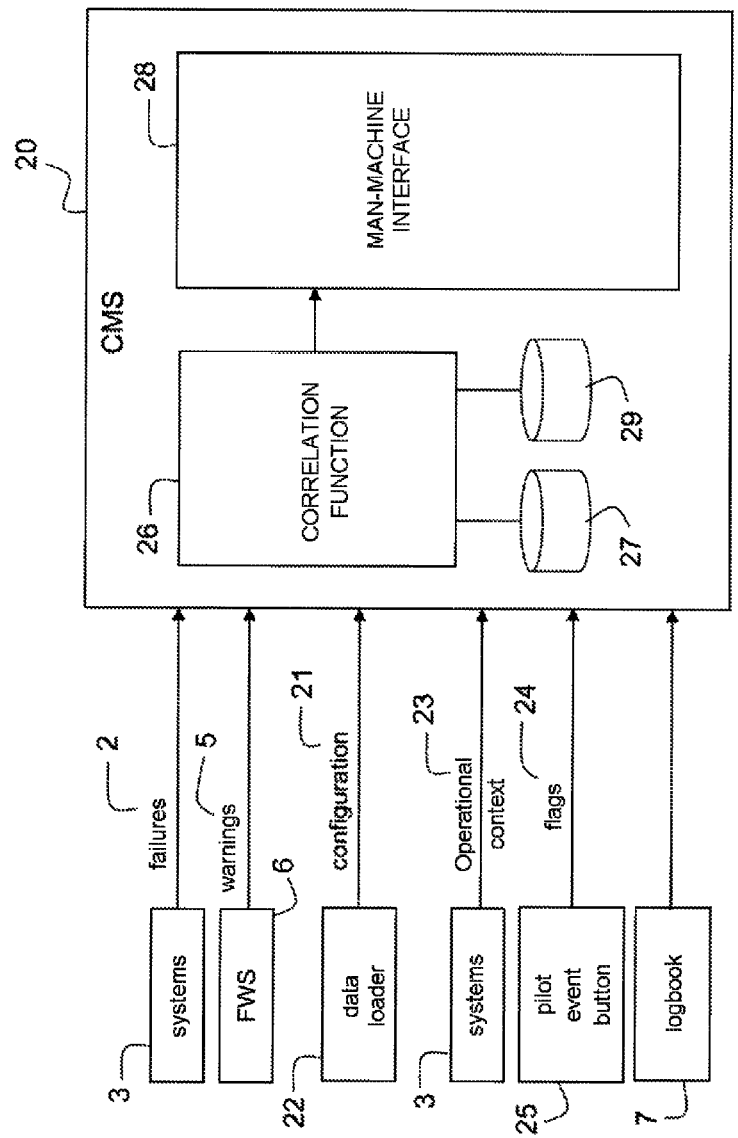
FIG. 2 shows a centralized maintenance device according to the invention.

FIG. 2 shows a second centralized maintenance device CMS 20, according to the invention.

The second CMS 20 notably receives the following data as inputs:
  the failure indicators 2, coming from the systems or items of equipment 3 of the aircraft;
  the warnings 5 coming from the FWS 6 of the aircraft;
  the logbook 7 kept by the crew of the aircraft;
  configuration data 21 of the aircraft, provided by a data loader 22;
  an operational context 23 provided by the systems 3 of the aircraft;
  flags 24, coming from a system managing pilot events, that is to say events for which the pilot of the aircraft has wished to raise a warning by using a switch, commonly called a "pilot event button", 25.

The configuration data 21 can notably comprise: a historical record of LRU updates, LRU being an acronym for "Line Replaceable Unit". The expression "LRU" denotes an equipment installed on-board an aircraft. The historical record of LRU updates notably comprises: identification of software or hardware version changes, a change of serial number of the LRU, a date of downloading a piece of software or of updating the said software.

The configuration data 21 furthermore comprise information on the current configuration of the aircraft, for example the hardware items installed in the aircraft in an optional manner, like three VHF radios. VHF is an acronym for "Very High Frequency". The configuration data 21 can also comprise a description of operational capabilities like an activation of a function, for example:
  a wind shear prediction function of a meteorological radar;
  a CPDLC system, an acronym for "Controller Pilot Data Link Communications", which is a data link for direct textual exchanges between a pilot of the aircraft and an air traffic controller;
  an ADS-B system, an acronym for "Automatic Dependent Surveillance-Broadcast", signifying a cooperative system for air traffic control;
  a FANS, an acronym for "Future Air Navigation System", which is a navigation system allowing communication by a direct data link between the air traffic controller and the pilot;
  other data links.

The current configuration of the aircraft can also comprise particular software versions.

The operational context can notably comprise the following data:
  flags generated at the request of the pilot by pressing the "pilot event button";
  physical parameters of the aircraft, varying over the course of time: geographical coordinates, altitudes, speeds, acceleration, vertical acceleration in the landing phase, mass of the aircraft, quantity of fuel on-board, aerodynamic configuration, meteorological conditions, states of on-board systems, state of the electrical power supply of the items of equipment.

The aerodynamic configuration of the aircraft can for example comprise an indication of the position of the undercarriages of the aircraft: retracted, deployed.

The meteorological conditions can comprise the following parameters varying during the flight of the aircraft: temperature, atmospheric pressure, air humidity rate, stormy weather, freezing conditions, turbulence.

The second CMS 20 notably carries out the following processings:
  a correlation by a correlation function 26 of the data relating to failures, warnings, operational context, configuration of the aircraft, flags 24, the logbook 7, received by the second CMS 20;
  a storage of the data received and of their correlation for several consecutive flights in a first database 27;
  a management of the historical record of the data received and of their correlation;
  a presentation of the data received, as a function of the historical record produced by the historical record management function, by a second man-machine interface 28;

The correlation function can carry out a correlation between all of the data received as a function of criteria and operational rules which can be defined in a second database 29.

Figure 3:
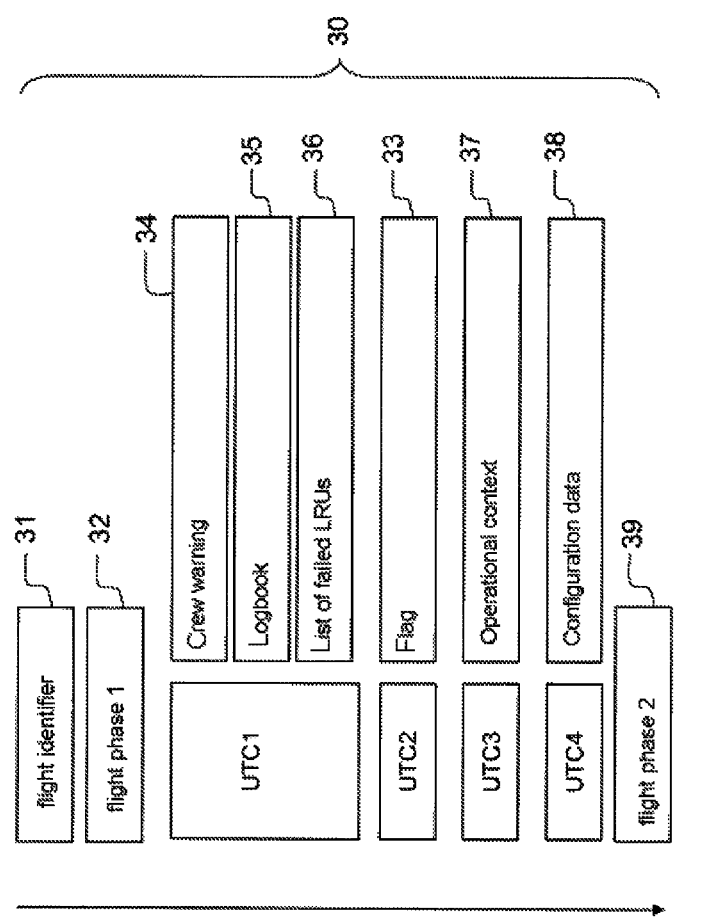
FIG. 3 shows an example of presentation of data managed by the centralized maintenance device.

FIG. 3 shows an example of presentation of data managed by the second centralized maintenance device 20 according to the invention. All of the maintenance data 30 can be presented in the form of a hierarchized list of data in a specified order. The order of hierarchization can be according to the date associated with each item of data, for example presenting the oldest item of data last. The maintenance data can be associated with a flight identified by a flight identifier 31. Then, the data can be classified by flight phase: for example a first flight phase 32, called flight phase 1 for example, can comprise the following data:
  for a first time UTC1: a crew warning 34, a logbook 35, a list of failed LRUs 36;
  for a second time UTC2: a flag 33;
  for a third time UTC3: an operational context 37;
  for a fourth time UTC4: configuration data of the aircraft 38.

A second flight phase, called flight phase 2 can also comprise maintenance data, not listed in FIG. 3.

Advantageously, the device according to the invention makes it possible to present to a maintenance operator a set of maintenance data grouped according to the time of their occurrence and according to their pertinence. For example, a failure affecting several LRUs for example can be indicated to the crew by a crew warning 34, then noted by the crew in the logbook 35 and finally the second CMS 20 can associate these items of information with a list of failed LRUs, if the LRUs have provided it with this information. These correlated items of data can be associated with a first time UTC1 corresponding for example to the time of the crew warning. The maintenance personnel thus has information allowing it to understand rapidly the events having resulted in the failure and to judge the extent of the criticality of the failure.

Figure 4:
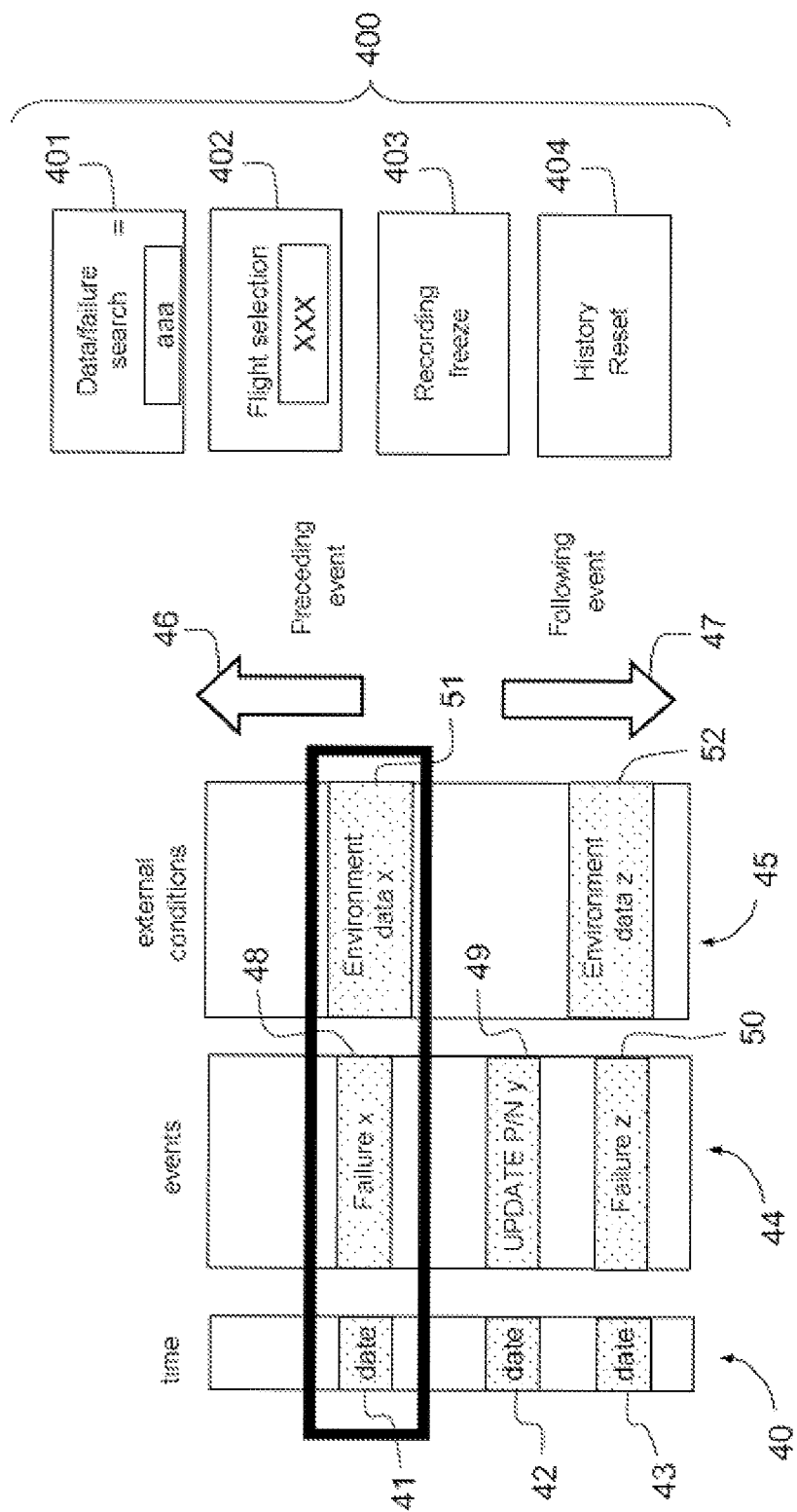
FIG. 4 shows an example of correlation of data managed by the centralized maintenance device according to the invention.

FIG. 4 shows an example of a second man-machine interface 28 presenting the maintenance data correlated by the second centralized maintenance device 20 according to the invention.

FIG. 4 shows, on a time scale 40 headed "time" the different dates 41, 42, 43 of occurrence of the events listed in an "events" column 44. The dates 41, 42, 43 can for example be ordered from the oldest date 41 at the top of the display 400 of the maintenance data on the second man-machine interface 28 to the most recent one 43 at the bottom of the display 400. Each item of data of the event type can be associated with external environment or "external conditions" data 45. A first upward arrow 46 allows an operator to display an event preceding a first displayed event 48. A second downward arrow 47 allows an operator to display an event following a last displayed event 44. Other interfaces 401, 402, 403, 404 allow an operator to consult particular data for example by performing:

- a search for a particular failure or for a particular item of data 401 in the first maintenance database 27 managed by the second CMS 20;
- a selection of data associated with a particular flight from among the maintenance data managed in the first database 27.

A second interface 403 allows an operator to request a "recording freeze" which notably has the function of a recording of maintenance data by the second CMS 20 according to the invention.

A third interface 404 allows the historical record to be reset to zero: the purpose of "History Reset" being to empty the first maintenance database 27.

Among the events 48, 49, 50 shown for example in FIG. 4:

- a first event 48 called "failure x" can occur at a first date 41 and can be linked with first external conditions "environment data x" 51;
- a second event 49 called "UPDATE P/N y", signifying "Update Part Number y", "Part Number" being an identifier, it being possible for the said second event 49 to occur at a second date 42 and not to be linked with any particular external condition;
- a third event 50 called "failure z" can occur at a third date 43 and can be linked with external conditions called, for example, "environment data z".

The second man-machine interface 400 shown in FIG. 4 is given by way of example; other representations are possible according to the applications.

Advantageously, the device according to the invention makes it possible to establish a very pertinent failure diagnosis and notably to eliminate the false failures within the centralized maintenance system.

The invention claimed is:

1. A centralized maintenance device installed on-board an aircraft, comprising:
   an on-board maintenance system being connected to systems of the aircraft, a warning system of the aircraft, and a logbook, the on-board maintenance system configured to receive data relating to:
   failures originating from the systems of the aircraft;
   warnings coming from the warning system of the aircraft;
   configurations of the systems of the aircraft;
   operational contexts of functioning of the systems of the aircraft that comprise physical parameters of the aircraft varying over a course of time;
   event flags, set by a crew of the aircraft; and
   a logbook, filled in by the crew of the aircraft;
   the on-board maintenance system further configured to generate a correlation of data, the correlation of data correlates data relating to the failures, the warnings, the configurations, the operational contexts, the flags and the logbook, received by the on-board maintenance system that are related;
   the on-board maintenance system further configured to store the data received by the on-board maintenance system in a first database;
   the on-board maintenance system further configured to carry out a management of a historical record of the data received and of their correlation;
   the on-board maintenance system further configured to carry out a transmission to a man-machine interface of the data received, of their correlation and of a date associated with each item of data received; and
   the on-board maintenance system further configured to carry out a display by the man-machine interface of a hierarchized list of data according to a date associated with each item of data, a flight identifier associated with the list of data, a time associated with each item of data, and a flight phase associated with each item of data.

2. The device according to claim 1, further comprising a second database,
   wherein the on-board maintenance system is further configured to generate the correlation of the data according to rules and criteria defined in the second database.

3. The device according claim 1, wherein the configuration data received by the on-board maintenance device comprise: a list of the systems of the aircraft and a historical record of updates of the systems of the aircraft.

4. The device according to claim 1, wherein the operational context data comprise the physical parameters of the aircraft varying over the course of time and comprise at least one of: geographical coordinates, altitudes, speeds, mass, aerodynamic configuration, quantity of fuel on-board, operational state of the on-board items of equipment, meteorological conditions.

5. The device according to claim 1, further comprising a second man-machine interface presenting maintenance data based on the correlated data generated by the on-board maintenance system.

6. The device according to claim 5, wherein the second man-machine interface is configured to provide an interface configured to receive a request for a search for a particular failure or for a particular item of data.

7. The device according to claim 5, wherein the second man-machine interface is configured to provide an interface configured to receive a selection of data associated with a particular flight from among the maintenance data.

8. The device according to claim 5, wherein the second man-machine interface is configured to provide an interface configured to allow an operator to request a recording of the maintenance data.

9. The device according to claim 5, wherein the second man-machine interface is configured to provide an interface to receive a request to reset a historical record; and wherein the on-board maintenance device is configured to reset the historical record in response to the request.

10. A centralized maintenance device installed on-board an aircraft, comprising:
a man-machine interface;
a first database;
an on-board maintenance system being connected to systems of the aircraft, a warning system of the aircraft, and a logbook, the on-board maintenance system configured to receive data relating to:
failures originating from the systems of the aircraft;
warnings coming from the warning system of the aircraft;
configurations of the systems of the aircraft;
operational contexts of functioning of the systems of the aircraft that comprise physical parameters of the aircraft varying over a course of time;
event flags, set by a crew of the aircraft; and
a logbook, filled in by the crew of the aircraft;
the on-board maintenance system further configured to generate a correlation of data, the correlation of data correlates data relating to the failures, the warnings, the configurations, the operational contexts, the flags and the logbook, received by the on-board maintenance system that are related;
the first database configured to store the data received by the on-board maintenance system;
the on-board maintenance system further configured to generate a historical record of the data received and of their correlation;
the on-board maintenance system further configured to transmit to the man-machine interface the data received, the correlation of the data received, and of a date associated with each item of the data received; and
the man machine interface being configured to display the received data, the correlation of the received data, and the date associated with each item of data,
wherein the man-machine interface is further configured to display a hierarchized list of data according to a date associated with each item of data, a flight identifier associated with the list of data, a time associated with each item of data, and a flight phase associated with each item of data.

11. The device according to claim 10, further comprising a second database,
wherein the on-board maintenance system is further configured to generate the correlation of the data according to rules and criteria defined in the second database.

12. The device according claim 10, wherein the configuration data received by the on-board maintenance device comprise: a list of the systems of the aircraft and a historical record of updates of the systems of the aircraft.

13. The device according to claim 10, wherein the operational context data comprise the physical parameters of the aircraft varying over the course of time and comprise at least one of: geographical coordinates, altitudes, speeds, mass, aerodynamic configuration, quantity of fuel on-board, operational state of the on-board items of equipment, meteorological conditions.

14. The device according to claim 10, further comprising a second man-machine interface presenting maintenance data based on the correlated data generated by the on-board maintenance system.

15. The device according to claim 14, wherein the second man-machine interface is configured to provide an interface configured to receive a request for a search for a particular failure or for a particular item of data.

16. The device according to claim 14, wherein the second man-machine interface is configured to provide an interface configured to receive a selection of data associated with a particular flight from among the maintenance data.

17. The device according to claim 14, wherein the second man-machine interface is configured to provide an interface configured to allow an operator to request a recording of the maintenance data.

18. The device according to claim 14, wherein the second man-machine interface is configured to provide an interface to receive a request to reset a historical record; and wherein the on-board maintenance device is configured to reset the historical record in response to the request.

19. A centralized maintenance device installed on-board an aircraft, comprising:
a man-machine interface;
a first database;
a second database;
an on-board maintenance system being connected to systems of the aircraft, a warning system of the aircraft, and a logbook, the on-board maintenance system configured to receive data relating to:
failures originating from the systems of the aircraft;
warnings coming from the warning system of the aircraft;
configurations of the systems of the aircraft;
operational contexts of functioning of the systems of the aircraft that comprise physical parameters of the aircraft varying over a course of time;
event flags, set by a crew of the aircraft; and
a logbook, filled in by the crew of the aircraft;
the on-board maintenance system further configured to generate a correlation of data, the correlation of data correlates data relating to the failures, the warnings, the configurations, the operational contexts, the flags and the logbook, received by the on-board maintenance system that are related;
the first database configured to store the data received by the on-board maintenance system;
the on-board maintenance system further configured to generate a historical record of the data received and of their correlation;
the on-board maintenance system further configured to transmit to the man-machine interface the data received, the correlation of the data received, and of a date associated with each item of the data received; and
the man machine interface being configured to display the received data, the correlation of the received data, and the date associated with each item of data,
wherein the man-machine interface is further configured to display a hierarchized list of data according to a date associated with each item of data, a flight identifier associated with the list of data, a time associated with each item of data, and a flight phase associated with each item of data;
wherein the on-board maintenance system is further configured to generate the correlation of the data according to rules and criteria defined in the second database; and wherein the configuration data received by the on-board maintenance device comprise: a list of the systems of the aircraft and a historical record of updates of the systems of the aircraft.

* * * * *